(12) United States Patent
Sherwood (10) Patent No.: US 12,523,327 B2
(45) Date of Patent: Jan. 13, 2026

(54) ELBOW CONNECTION FOR A WATER DRAINAGE SYSTEM

(71) Applicant: Robert Sherwood, Almont, MI (US)

(72) Inventor: Robert Sherwood, Almont, MI (US)

( * ) Notice: Subject to any disclaimer, the term of this patent is extended or adjusted under 35 U.S.C. 154(b) by 144 days.

(21) Appl. No.: 18/508,811

(22) Filed: Nov. 14, 2023

(65) Prior Publication Data

US 2025/0155064 A1   May 15, 2025

(51) Int. Cl.
*E04D 13/08*      (2006.01)
*F16L 43/00*      (2006.01)

(52) U.S. Cl.
CPC .............. *F16L 43/00* (2013.01); *E04D 13/08* (2013.01); *E04D 2013/0806* (2013.01)

(58) Field of Classification Search
CPC ... F16L 43/00; E04D 13/08; E04D 2013/0806
See application file for complete search history.

(56) References Cited

U.S. PATENT DOCUMENTS

| | | | | |
|---|---|---|---|---|
| 5,984,374 A * | 11/1999 | Esser | ...................... | F16L 57/06 |
| | | | | 285/179 |
| 7,546,850 B1 * | 6/2009 | Pesek | ...................... | E03B 11/14 |
| | | | | 220/745 |
| 11,619,038 B2 | 4/2023 | Sherwood | | |
| 2006/0022456 A1 * | 2/2006 | Hull | ........................ | F16L 25/01 |
| | | | | 285/179 |
| 2016/0273810 A1 * | 9/2016 | Army, Jr. | ................ | F25B 13/00 |
| 2020/0072404 A1 * | 3/2020 | Riddle | .................. | F16L 13/116 |
| 2021/0404184 A1 * | 12/2021 | Fox | ......................... | E04D 13/08 |
| 2022/0128072 A1 * | 4/2022 | Kintea | ..................... | F15D 1/04 |

FOREIGN PATENT DOCUMENTS

WO    WO-2021119815 A1 *   6/2021   ............. E04D 13/08

* cited by examiner

*Primary Examiner* — James M Hewitt, II
(74) *Attorney, Agent, or Firm* — Brooks Kushman P.C.

(57) ABSTRACT

An elbow connection includes a first conduit, a second conduit, and a bend. The first conduit defines a first open end. The first open end is configured to connect to a first external component and establish fluid communication between the first conduit and the first external component. The second conduit defines a second open end. The second open end is configured to connect to a second external component and establish fluid communication between the second conduit and the second external component. The bend extends between the first and second conduits. The bend defines a channel extending between the first and second conduits. The channel establishes fluid communication between the first and second conduits. The bend has a ramped surface that at least partially defines the channel and extends between the first and second conduits. The bend orients the first conduit at an angle relative to the second conduit.

19 Claims, 5 Drawing Sheets

ELBOW CONNECTION FOR A WATER DRAINAGE SYSTEM

TECHNICAL FIELD

The present disclosure relates to water drainage systems and corresponding conduits that are utilized in water drainage systems.

BACKGROUND

Runoff water may be directed away from buildings and houses via water drainages systems.

SUMMARY

An elbow connection includes a first conduit, a second conduit, and a bent region. The first conduit has a first open end. The first open end is configured to connect to a first external component and establish fluid communication between the first conduit and the first external component. The second conduit has a second open end. The second open end is configured to connect to a second external component and establish fluid communication between the second conduit and the second external component. The bent region extends between the first and second conduits. The bent region defines a channel extending between the first and second conduits. The channel establishes fluid communication between the first and second conduits. The bent region has a ramped surface that at least partially defines the channel and extends between the first and second conduits. The bent region orients the first conduit at an angle relative to the second conduit. The angle is less than 100° and greater than 90°.

An elbow connection includes a first conduit, a second conduit, and a bend. The first conduit defines a first opening configured to establish a first fluid connection. The second conduit defines a second opening configured to establish a second fluid connection. The bend extends between the first and second conduits. The bend defines a channel establishing fluid communication between the first and second conduits. The bend has a ramped surface that at least partially defines the channel. The ramped surface extends between the first and second conduits.

A conduit includes a first region, a second region, and a bend. The first region extends along a first axis. The second region extends along a second axis. The bend extends between the first region and the second region. The bend defines a channel establishing fluid communication between the first and second regions. The bend orients the first axis at an angle relative to the second axis. The angle is substantially 95°.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
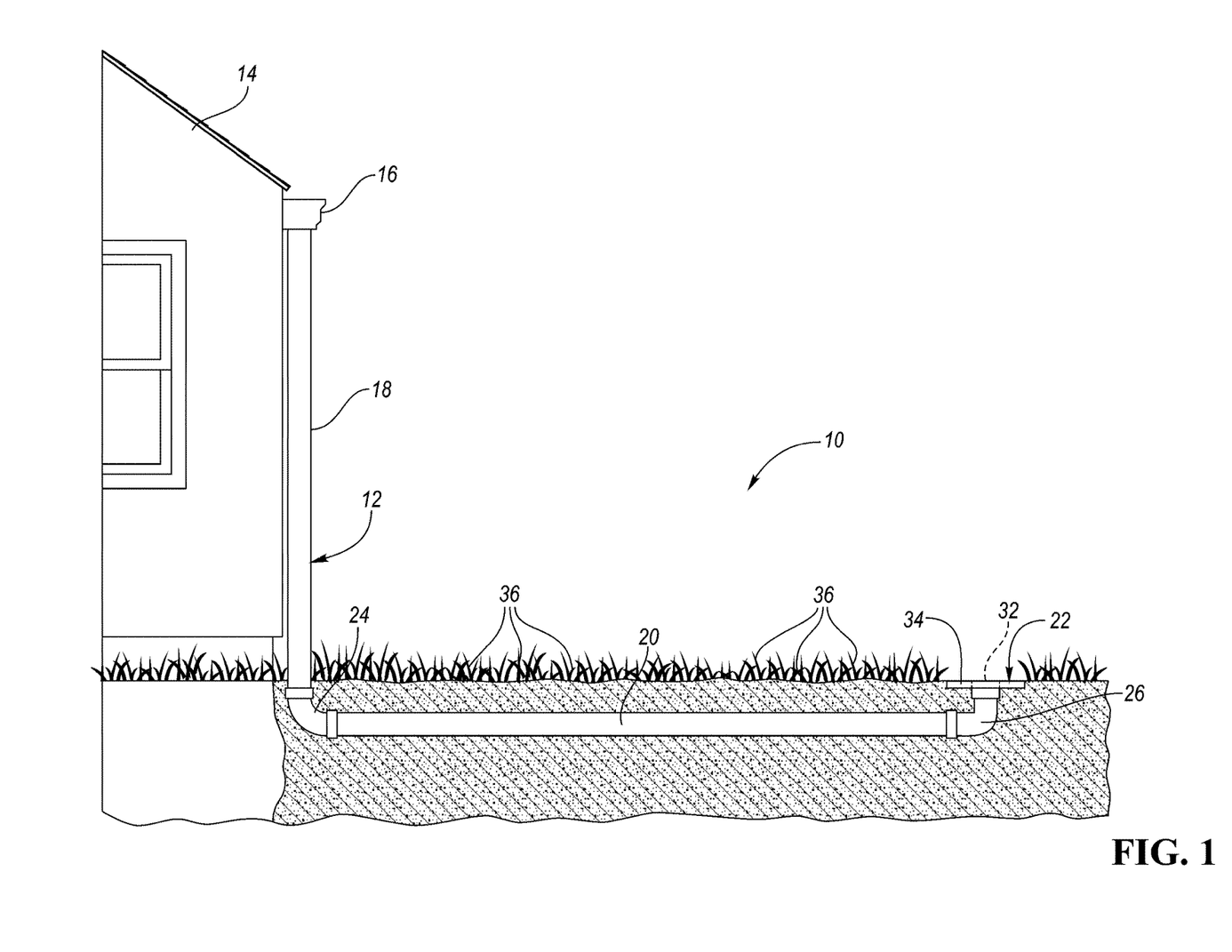
FIG. 1 is a front view of a water drainage system for a building or house.
Figure 2:
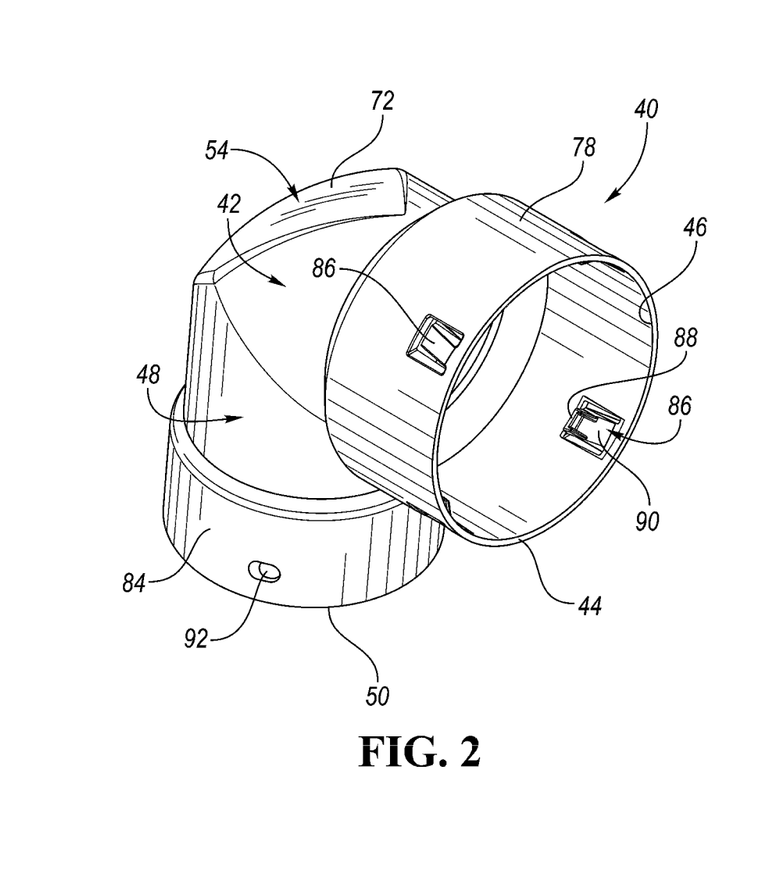
FIG. 2 is a top perspective view of an elbow connection that may be utilized in a water drainage system.
Figure 3:
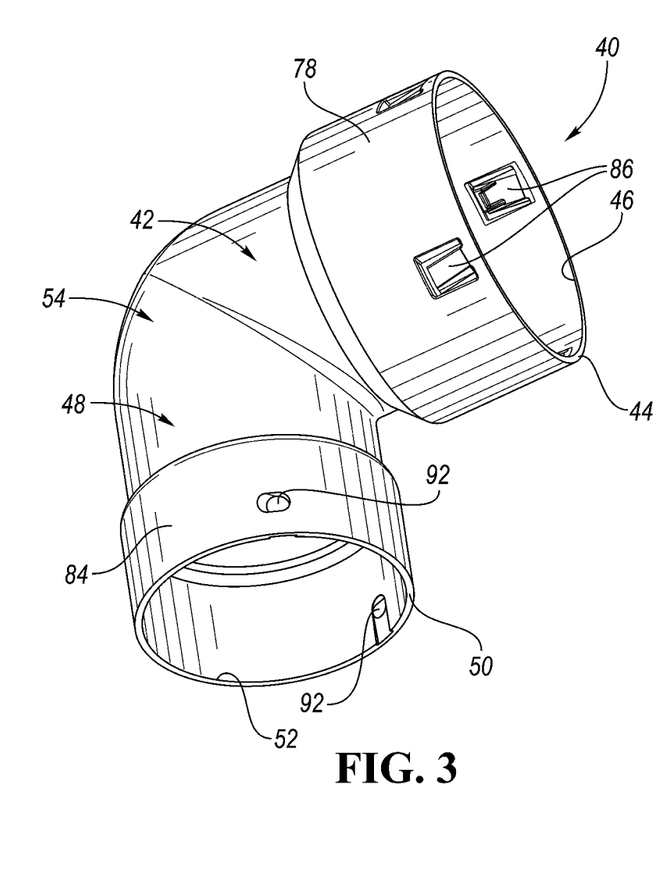
FIG. 3 is a bottom perspective view of the elbow connection.
Figure 4:
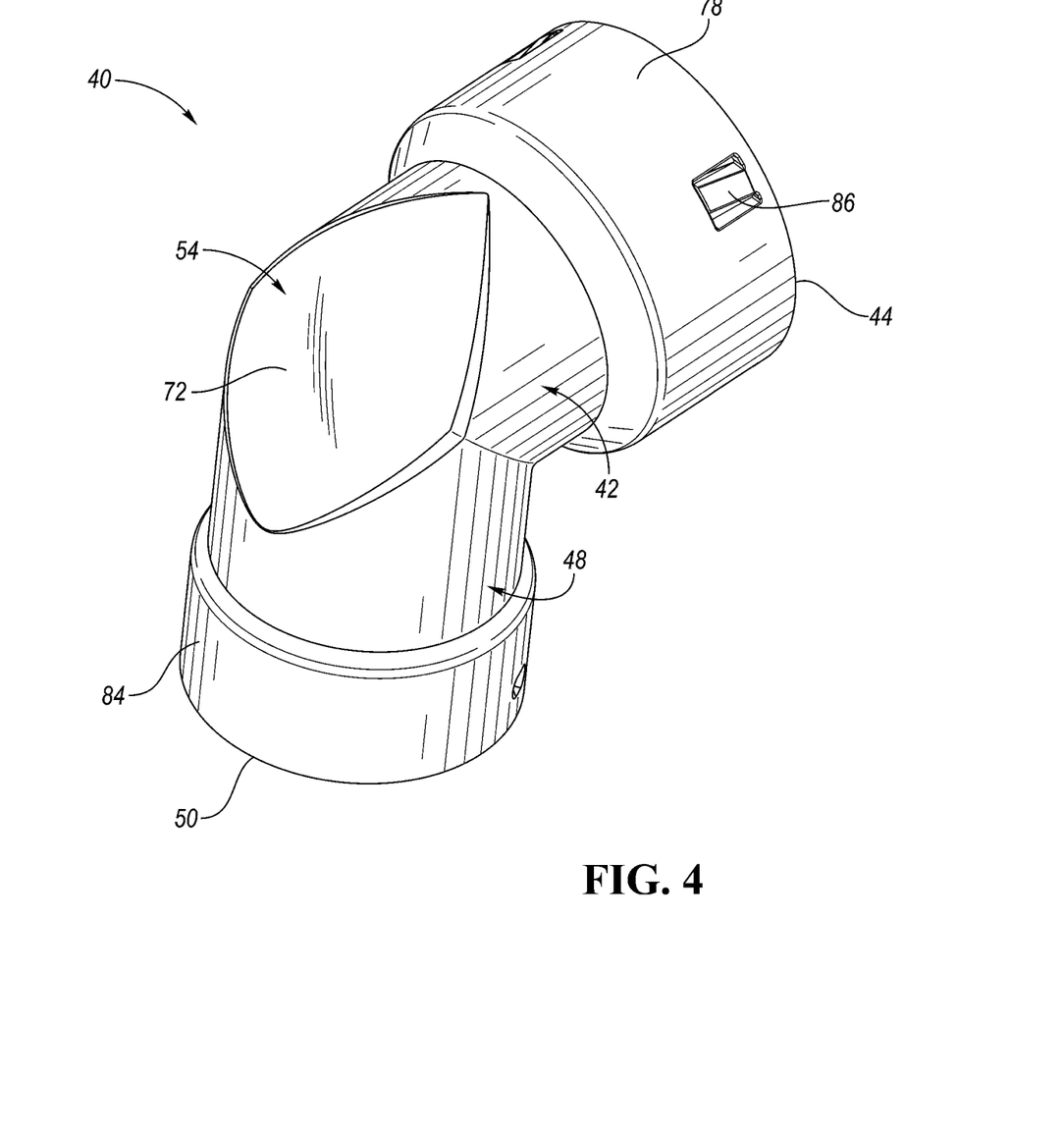
FIG. 4 is a rear perspective view of the elbow connection.
Figure 5:
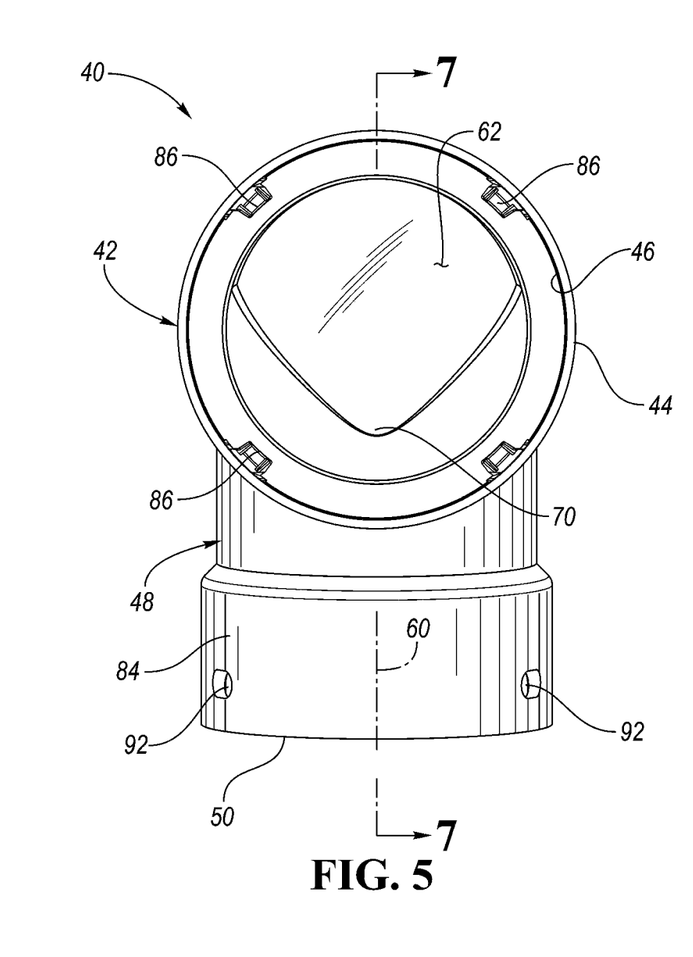
FIG. 5 is a front view of the elbow connection.
Figure 6:
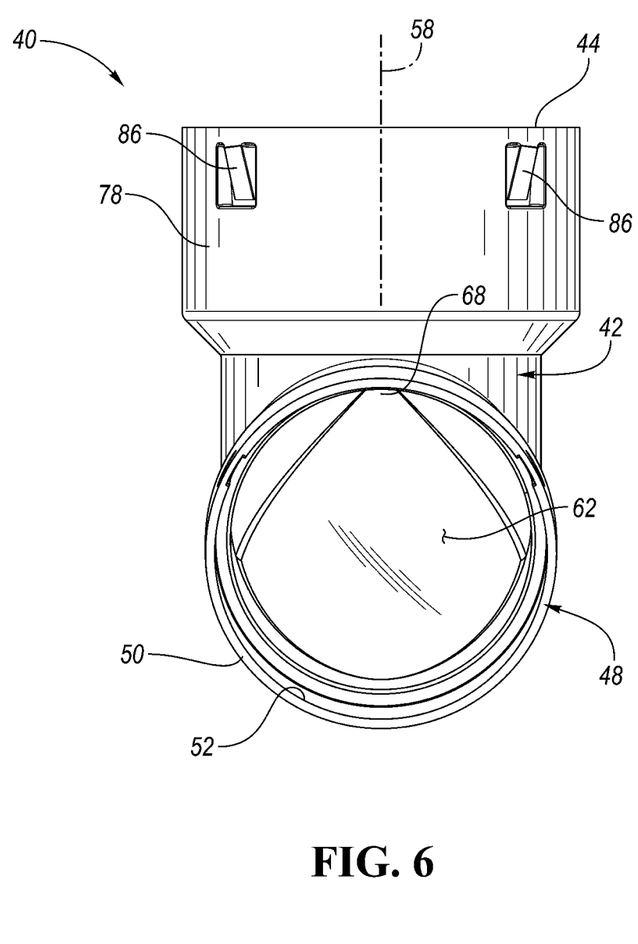
FIG. 6 is a bottom view of the elbow connection.

Referring to FIG. 1, a water drainage system 10 is illustrated. The water drainage system 10 may specifically be designed to direct water away from a house or building in order to prevent runoff water from the house or building from flooding the lower level (e.g., the basement) of the house or building. It should be understood, however, that the water drainage system 10 may be utilized in other scenarios and should not be construed as limited to a water drainage system that is configured to direct water away from a house or building. For example, the water drainage system could be utilized to direct water away from a field, such as an athletic field, or a paved surface, such as a road or parking lot. The water drainage system 10 may be further comprised to direct water toward a storm drain system, and more specifically toward a catch basin of a storm drain system.

As illustrated in FIG. 1, the water drainage system 10 includes tubes, pipes, or conduits 12 that are configured to direct water away from a house or building 14. More specifically, the conduits 12 may be configured to direct water away from an eavestrough 16 that is disposed along edges of a roof of the building 14. The eavestrough 16 is configured to collect runoff water that cascades down the roof of the building 14 during rainstorms, from melting snow, or from any other source. The conduits 12 are configured to direct the water away from the eavestrough 16 and away from the building 14.

The tubes, pipes, or conduits 12 of the water drainage system 10 may include a downspout 18 that is configured to direct water downward from the eavestrough 16 to a horizontal tube, pipe, or conduit 20. The horizontal conduit 20 in turn may be configured to direct water from the downspout 18 to a pop-up drain emitter 22 that is connected to the water drainage system 10. The pop-up drain emitter 22 may be referred to as the pop-up emitter 22. The horizontal conduit 20 may include a slight downward slope extending in a direction from the downspout 18 to the pop-up emitter 22 such that water flows from the downspout 18 to the pop-up emitter 22. The downspout 18 may be connected to the horizontal conduit 20 via a first elbow tube, pipe, conduit, or connection 24. The horizontal tube 20 and the first elbow conduit 24 may be disposed or buried underground, which may be for aesthetic purposes or may be to prevent placing an obstacle on an area of ground that may require maintenance (e.g., the area of ground may include grass that needs to be mowed on a regular basis) or that may have a significant amount of foot traffic.

The pop-up emitter 22 may be connected to the horizontal conduit 20 via a second elbow tube, pipe, conduit, or connection 26. Water may flow from the pop-up emitter 22 and onto the surrounding ground area (e.g., the ground surrounding the pop-up emitter 22). The water may flow from the surrounding ground area and toward a catch basin that is part of a municipal storm drain system. The water may flow over a curb and onto a road where the catch basin of the municipal storm drain system may be located. An example of a pop-up emitter that disposed adjacent to a curb and a catch basin of a municipal storm drain system is disclosed in U.S. Pat. No. 11,619,038, filed on Apr. 8, 2021, which is incorporated by reference herein in its entirety. Alternatively, the water may flow from the surrounding ground area and toward a drainage ditch (e.g., a ditch that is adjacent to a road). The second elbow tube, pipe, conduit, or connection 26 may bend upward from the horizontal tube 20 to connect the horizontal tube 20 to the pop-up emitter 22 such that water can flow out of the horizontal tube 20 via the pop-up emitter 22.

The pop-up emitter 22 may have a pop-up lid, or more simply lid 32, that is configured to transition between a retracted or closed position, where the lid 32 is approximately flush or slightly above the upper surface of the ground, and an advanced or opened position, where the lid 32 is above the upper surface the ground. In the retracted or closed position, the lid 32 is positioned to be below and out the way of any yard maintenance tools or machinery, particular the rotating blade of a lawnmower. In the advanced or opened position, the lid 32 transitions away from an opening or orifice defined by the pop-up emitter 22 such that water is able to flow out of the opening or orifice defined by the pop-up emitter 22. In the retracted or closed position, the lid 32 is configured to rest upon a seat or rim defined by the pop-up emitter 22 such that the lid 32 covers the opening or orifice defined by the pop-up emitter 22.

A turf cover 34 may be disposed radially about the lid 32. The turf cover 34 is configured to engage the ground to inhibit vegetative growth (e.g., grass 36) proximate to and radially about an outer periphery of the lid 32. More specifically, the turf cover 34 may cover the ground such that sunlight is unable to penetrate the ground directly below the turf cover 34, which inhibits the vegetative growth. The lid 32 and the turf cover 34 may both be green in color in order to blend in with the adjacent vegetation, or more specifically with the adjacent grass, which may be for aesthetic purposes.

As previously stated, the conduits 12 may be configured to direct water away from any source, and this disclosure should not be construed as limited to the layout of conduits 12 as demonstrated in FIG. 1. For example, the first elbow conduit 24 is illustrated as a 90° elbow (i.e., an elbow pipe that turns at a 90° angle). However, the first elbow conduit 24 may be reconfigured as an elbow that turns at any desirable angle.

Referring to FIGS. 2-7, an elbow conduit or elbow connection 40 is illustrated. The elbow connection may correspond the first elbow tube, pipe, conduit, and/or connection 24 or to the second elbow tube, pipe, conduit, or connection 26 illustrated in FIG. 1. However, it should be understood that the elbow connection 40 may be connected to any other mating component including, but not limited to other conduits (straight or bent), pop-up emitters, caps, reducers, nozzles, couplers, etc.

The elbow connection 40 includes a first region or a first conduit 42. The first conduit 42 has a first open end 44 defining a first opening 46. The first open end 44 is configured establish a first fluid connection. More specifically, the first open end 44 is configured to connect to a first external component (e.g., the horizontal conduit 20 in FIG. 1, the pop-up emitter 22 in FIG. 1, caps, reducers, nozzles, couplers, etc.) to establish a first fluid connection. The first fluid connection may establish fluid communication between the first conduit 42 and the first external component. More specifically the first opening 46 may establish the first fluid connection with the first external component in order to establish fluid communication between the first conduit 42 and the first external component.

The elbow connection 40 includes a second region or a second conduit 48. The second conduit 48 has a second open end 50 defining a second opening 52. The second open end 50 is configured establish a second fluid connection. More specifically, the second open end 50 is configured to connect to a second external component (e.g., the horizontal conduit 20 in FIG. 1, the pop-up emitter 22 in FIG. 1, caps, reducers, nozzles, couplers, etc.) to establish a second fluid connection. The second fluid connection may establish fluid communication between the second conduit 48 and the second external component. More specifically the second opening 52 may establish the second fluid connection with the second external component in order to establish fluid communication between the second conduit 48 and the second external component.

The elbow connection 40 also includes a bent region or bend 54. The bend extends between the first conduit 42 and the second conduit 48. The first conduit 42, the second conduit 48, and the bend 54 may be formed as single integrated component (e.g., the first conduit 42, the second conduit 48, and the bend 54 may be formed as single component during a molding process). Such a single integrated component may be made from any desirable material, including but not limited to, plastics (e.g., thermoplastics, thermoset plastics, or polymers), metals, (e.g., e.g., iron, steel, aluminum, magnesium, titanium, or any other metal), ceramics, stoneware, etc. More specifically, the single integrated component may be made from polyvinyl chloride (PVC).

The bend 54 also defines a channel 56 that extends between the first conduit 42 and the second conduit 48. The channel 56 establishes fluid communication between the first conduit 42 and the second conduit 48. Ultimately, the channel 56 facilitates establishing fluid communication between the first external component when connected to the first open end 44 of the first conduit 42 and the second external component when connected to the second open end 50 of the second conduit 48. The channel 56 may also extend through the first conduit 42 and the second conduit 48, and to the first opening 46 and the second opening 52, respectively. Alternatively, it may be stated that the channel 56 is in fluid communication with channels defined by the first conduit 42 and the second conduit 48 that in turn extend to the first opening 46 and the second opening 52, respectively.

The first conduit 42 extends along first axis 58. The second conduit 48 extends along a second axis 60. The first axis 58 and the second axis 60 may be oriented at an angle relative to each other such that the first conduit 42 and the second conduit 48 are oriented an angle relative to each other. More specifically, the bend 54 may orient the first conduit 42 and the second conduit 48 at an angle relative to each other. The bend 54 may also orient the first axis 58 and the second axis 60 at an angle relative to each other. The first axis 58 and the second axis 60 may be positioned along a common plane (e.g., the first axis 58 and the second axis 60 may be coplanar) and may be oriented at an angle θ relative to each other along the common plane.

The angle θ between the first axis 58 and the second axis 60, or the angle between the first conduit 42 and the second conduit 48, may be less than 100° and greater than 90°. More specifically, the angle θ between the first axis 58 and the second axis 60, or the angle between the first conduit 42 and the second conduit 48, may be substantially 95°. As used herein, substantially 95° refers to any incremental angle that is between exactly 95° and 1° or less from exactly 95° (e.g., 1° or less from exactly 95°, 0.5° or less from exactly 95°, 0.25° or less from exactly 95°, 0.10 or less from exactly 95°, 0.01° or less from exactly 95°, etc.). Orienting the first conduit 42 and the second conduit 48 at an angle relative to each other that is substantially 95° provides several advantages over a standard 90° elbow where the opposing open ends are oriented at 90° relative to each other. For example, if the first elbow conduit 24 illustrated in FIG. 1 were to comprise the elbow connection 40, the horizontal conduit 20 would be orientated at a slight downward angle, which would facilitate routing water away from the building 14, which is necessary to prevent water corrosion to the foundation of the building 14. As another example, if the second elbow conduit 26 illustrated in FIG. 1 were to comprise the elbow connection 40, the opening along the top of the pop-up emitter 22 would be slightly tilted, which would facilitate routing water out of the pop-up emitter 22.

It is noted that the designation or term for referring to an elbow connection (e.g., elbow connection 40) may include the angle (e.g., angle θ) between the two axes (e.g., the first axis 58 and the second axis 60) of the elbow connection, where the angle θ extends from the first portion (e.g., first conduit 42) of the elbow connection and toward the second portion (e.g., second conduit 48) of the elbow connection. For example, if angle θ is equal to 95°, the elbow connection 40 may be referred to as a 95° elbow or a 95° elbow connection. Alternatively, the designation or term for referring to an elbow connection (e.g., elbow connection 40) may include an angle Φ between the two axes (e.g., the first axis 58 and the second axis 60) of the elbow connection, where the angle Φ extends from the first portion (e.g., first conduit 42) of the elbow connection and away from the second portion (e.g., second conduit 48) of the elbow connection. For example, if angle θ is equal to 95° and angle Φ is equal to 85°, the elbow connection 40 may be referred to as an 85° elbow or an 85° elbow connection.

Figure 7:
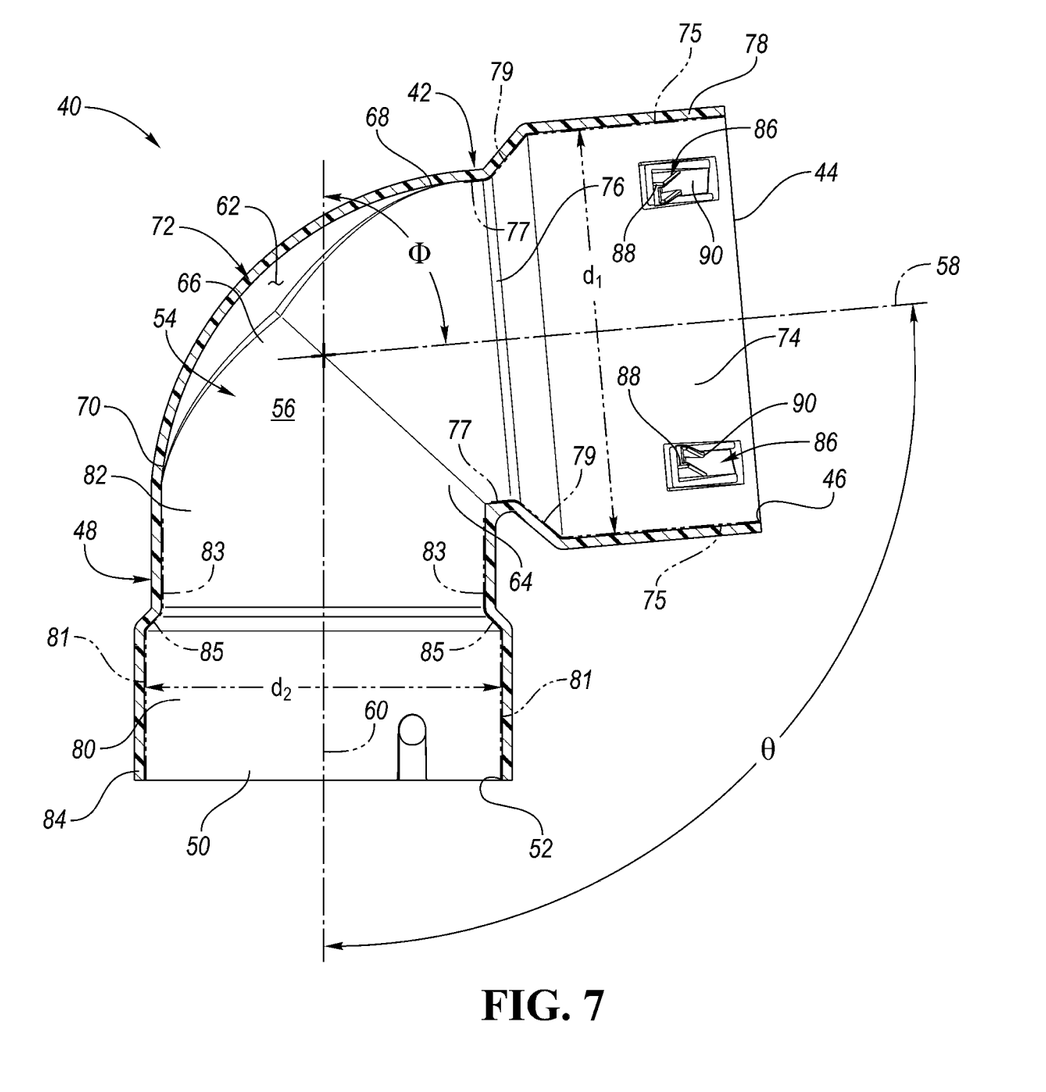
FIG. 7 is a cross-sectional view taken along line 7-7 in FIG. 5.

The elbow connection 40 includes a ramped surface 62 that at least partially defines the channel 56. The ramped surface 62 extends between the first conduit 42 and the second conduit 48 along the bend 54. The ramped surface 62 reduces deceleration that occurs through the elbow connection 40 relative to a standard elbow connection (e.g., a standard 90° elbow) that does not have such a ramped surface, which in turn allows water to flow through the elbow connection 40 at a greater velocity relative to the water flowing through a standard elbow connection. This increase in velocity of the water prevents the buildup of sediment in the elbow connection 40 and ultimately prevents a complete block or obstruction within the elbow connection 40. For example, when a standard 90° elbow is utilized as a connection along a lower end of downspout from a building (e.g., the first elbow conduit 24 illustrated in FIG. 1), gravel from roof shingles on the building (e.g., building 14) tend to collect within such a standard 90° elbow. On the other hand, testing has demonstrated that little to zero sediment will collect in an elbow connection design in accordance with elbow connection 40.

The bend 54 includes a radially inward region or section 64 and a radially outward region or section 66. The ramped surface 62 may be positioned internally within the elbow connection 40 on or along the radially outward section 66. The ramped surface 62 extends between a first end 68 and a second end 70. The ramped surface 62 terminates at the first end 68 and along the first conduit 42 but short of the first open end 44 of the first conduit 42. The first end 68 of the ramped surface 62 is spaced-apart from the first open end 44 and is spaced-apart from the first opening 46. The ramped surface 62 terminates at the second end 70 and along the second conduit 48 but short of the second open end 50 of the second conduit 48. The second end 70 of the ramped surface 62 is spaced-apart from the second open end 50 and is spaced-apart from the second opening 52. The ramped surface 62 may be an internal surface of a ramped section 72 of the elbow connection 40 that extends between the first conduit 42 and the second conduit 48 along the bend 54.

The ramped sections 72 and the ramped surface 62 result in steeper change in direction of water flow from the first conduit 42 to the second conduit 48 relative to a standard elbow connection (e.g., a standard 90° elbow) where the change in direction of water flow is more gradual. This steeper change in direction helps to reduce deceleration that occurs through the elbow connection 40 relative to a standard elbow connection (e.g., a standard 90° elbow), which is beneficial for the reasons stated above. The ramped sections 72 and the ramped surface 62 may be flat or may have a curvature as illustrated.

An internal diameter $d_1$ of the first conduit 42 is greater or larger along a region or section 74 of the first conduit 42 that includes and is adjacent to the first open end 44 and the first opening 46 relative to a remainder 76 of the first conduit 42. The section 74 of the first conduit 42 may include a bell or flange 78 where the internal diameter $d_1$ is greater or larger relative to other regions where the internal diameter $d_1$ is present or defined. The bell or flange 78 may be configured to engage a first external component or mating component (e.g., the horizontal conduit 20 in FIG. 1, the pop-up emitter 22 in FIG. 1, caps, reducers, nozzles, couplers, etc.) internally or externally along the bell or flange 78.

The internal diameter $d_1$ of the first conduit 42 may be constant along the region or section 74 of the first conduit 42 as illustrated by phantom lines 75. The internal diameter $d_1$ of the first conduit 42 along the remainder 76 of the first conduit 42 may include a first area or region where the diameter $d_1$ of the first conduit 42 is constant, as illustrated by phantom lines 77. The internal diameter $d_1$ of the first conduit 42 along the remainder 76 of the first conduit 42 may also include a second area or region where the diameter $d_1$ of the first conduit 42 is ramped and transitions linearly between two different constant values as illustrated by phantom lines 79 (e.g., phantom lines 79 illustrate a transition between two constant values, where the two constant values are illustrated as phantom lines 75 and lines 77).

An internal diameter $d_2$ of the second conduit 48 is greater or larger along a region or section 80 of the second conduit 48 that includes and is adjacent to the second open end 50 and the second opening 52 relative to a remainder 82 of the second conduit 48. The section 80 of the second conduit 48 may include a bell or flange 84 where the internal diameter $d_2$ is greater or larger relative to other regions where the internal diameter $d_2$ is present or defined. The bell or flange 84 may be configured to engage a second external component or mating component (e.g., the horizontal conduit 20 in FIG. 1, the pop-up emitter 22 in FIG. 1, caps, reducers, nozzles, couplers, etc.) internally or externally along the bell or flange 84.

The internal diameter $d_2$ of the second conduit 48 may be constant along the region or section 80 of the second conduit 48 as illustrated by phantom lines 81. The internal diameter $d_2$ of the second conduit 48 along the remainder 82 of the second conduit 48 may include a first area or region where the diameter $d_2$ of the second conduit 48 is constant, as illustrated by phantom lines 83. The internal diameter $d_2$ of the second conduit 48 along the remainder 82 of the second conduit 48 may also include a second area or region where the diameter $d_2$ of the second conduit 48 is ramped and transitions linearly between two different constant values as illustrated by phantom lines 85 (e.g., phantom lines 85 illustrate a transition between two constant values, where the two constant values are illustrated as phantom lines 81 and lines 83).

Clips 86 may be disposed on or extend from the section 74 of the first conduit 42. More specifically, the clips 86 may include protrusions 88 that each extend from a biasing element 90 along the bell or flange 78. The protrusions 88 may extend inward into the first conduit 42 and the clips 86 may be configured to engage the first external component or mating component. The first external component or mating component may comprise corrugated pipe or tubing in order to secure the first external component or mating component to the first conduit 42. The protrusions 88 may be disposed within valleys and between rings that form the corrugated pipe or tubing. The biasing elements 90 may be configured to maintain the position of the protrusions 88 within the valleys and between the rings of the corrugated pipe or tubing once the corrugated pipe or tubing is installed onto the first conduit 42.

The section 80 of the second conduit 48 may define aligned orifices 92. More specifically, the aligned orifices 92 may be defined along the bell or flange 84. The align orifices 92 may further be offset from a center of the second conduit 48 or from a center of the second opening 52. The aligned orifices 92 are configured to receive a pin to secure the second conduit 48 to the second external component or mating component. Such a pin may extend through a first of the aligned orifices 92, engage the second external component or mating component, and extend through a second of the aligned orifices 92 to secure the second conduit 48 and the second external component or mating component to each other.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. An elbow connection comprising:
   a first conduit having a first open end, wherein the first open end is configured to (i) connect to a first external component and (ii) establish fluid communication between the first conduit and the first external component;
   a second conduit having a second open end, wherein the second open end is configured to (i) connect to a second external component and (ii) establish fluid communication between the second conduit and the second external component; and
   a bent region (i) extending between the first and second conduits, (ii) defining a channel extending between the first and second conduits, wherein the channel establishes fluid communication between the first and second conduits, (iii) having a ramped surface that at least partially defines the channel and extends between the first and second conduits, wherein the ramped surface tapers and curves (a) laterally inward along a first direction that extends from a middle of the bent region and toward the first open end and (b) laterally inward along second direction that extends from the middle of the bent region and toward the second open end, and (iv) orienting the first conduit at an angle relative to the second conduit, wherein the angle is less than 100° and greater than 90°.

2. The elbow connection of claim 1, wherein the bent region includes a radially inward section and a radially outward section, and wherein the ramped surface is positioned internally on the radially outward section.

3. The elbow connection of claim 1, wherein the ramped surface (1) extends between first and second ends and (ii) terminates at the first end and along the first conduit, wherein the first end is spaced-apart from the first open end.

4. The elbow connection of claim 3, wherein the ramped surface terminates at the second end and along the second conduit, wherein the second end is spaced-apart from the second open end.

5. The elbow connection of claim 1, wherein the angle is substantially 95°.

6. The elbow connection of claim 1, wherein (1) an internal diameter of the first conduit is greater along a first region that includes and is adjacent to the first open end relative to a remainder of the first conduit, (ii) an internal diameter of the second conduit is greater along a second region that includes and is adjacent to the second open end relative to a remainder of the second conduit, and (lit) clips extending from the first region are configured to engage corrugated tubing.

7. The elbow connection of claim 6, wherein the second region defines aligned orifices configured to receive a pin to secure the second conduit to the second external component.

8. An elbow connection comprising:
   a first conduit defining a first opening configured to establish a first fluid connection:
   a second conduit defining a second opening configured to establish a second fluid connection;

a bend (1) extending between the first and second conduits, (ii) defining a channel establishing fluid communication between the first and second conduits, and (iii) having a ramped surface at least partially defining the channel and extending between the first and second conduits, wherein the ramped surface tapers and curves (a) laterally inward along a first direction that extends from a middle of the bend and toward the first opening and (b) laterally inward along second a direction that extends from the middle of the bend and toward the second opening; and wherein (i) the bend orients the first opening at an angle relative to the second opening and (ii) the angle is less than 100° and greater than 90°.

9. The elbow connection of claim 8, wherein (i) the bend orients the first opening at an angle relative to the second opening and (ii) the angle is substantially 959.

10. The elbow connection of claim 8, wherein the bend includes a radially inward section and a radially outward section, and wherein the ramped surface is positioned internally on the radially outward section.

11. The elbow connection of claim 8, wherein the ramped surface (i) extends between first and second ends and (it) terminates at the first end and along the first conduit, wherein the first end is spaced-apart from the first opening.

12. The elbow connection of claim 11, wherein the ramped surface terminates at the second end and along the second conduit, wherein the second end is spaced-apart from the second opening.

13. The elbow connection of claim 8, wherein (i) an internal diameter of the first conduit is greater along a fust section that includes and is adjacent to the first opening relative to a remainder of the first conduit, (ii) an internal diameter of the second conduit is greater along a second section that includes and is adjacent to the second opening relative to a remainder of the second conduit, and (iii) the first section defines aligned orifices configured to receive a pin to secure the first conduit to an external component.

14. The elbow connection of claim 13 further comprising clips extending from the second section, wherein the clips are configured to engage corrugated tubing.

15. A elbow connection comprising:
a first region extending along a first axis;
a second region extending along a second axis, and
a bend (1) extending between the first region and the second region, (ii) defining a channel establishing fluid communication between the first and second regions, (iii) orienting the first axis at an angle relative to the second axis, and (iv) having a ramped surface that at least partially defines the channel and extends between the first and second regions, wherein the ramped surface tapers and curves (a) laterally inward along a first direction that extends from a middle of the bend and toward the first region and (b) laterally inward along a second direction that extends from the middle of the bend and toward the second region.

16. The elbow connection of claim 15, wherein the bend includes a radially inward section and a radially outward section, and wherein the ramped surface is positioned internally on the radially outward section.

17. The elbow connection of claim 15, wherein the ramped surface (1) extends between first and second ends and (ii) terminates at the first end and along the first region, wherein the first end is spaced-apart from an open end of the first region.

18. The elbow connection of claim 17, wherein the ramped surface terminates at the second end and along the second region, wherein the second end is spaced-apart from an open end of the second region.

19. The elbow connection of claim 15, wherein the angle is substantially 95°.

* * * * *